United States Patent [19]

Mizokami et al.

[11] 4,295,720
[45] Oct. 20, 1981

[54] APPARATUS FOR DETERMINING LIGHT REFLECTION FROM A FOCAL PLANE SHUTTER

[75] Inventors: Kazunori Mizokami; Masahiro Kitagawa, both of Hachioji, Japan

[73] Assignee: Olympus Optical Company Ltd., Japan

[21] Appl. No.: 109,762

[22] Filed: Jan. 7, 1980

[30] Foreign Application Priority Data

Mar. 9, 1979 [JP] Japan ................. 54/27848

[51] Int. Cl.³ ............................................ G03B 7/083
[52] U.S. Cl. ................................................... 354/51
[58] Field of Search ........................................ 354/51

[56] References Cited
U.S. PATENT DOCUMENTS

3,994,001 11/1976 Maitani et al. ................. 354/51

*Primary Examiner*—Michael L. Gellner
*Attorney, Agent, or Firm*—Ostrolenk, Faber, Gerb & Soffen

[57] ABSTRACT

An apparatus for determining the amount of light reflected from a focal plane shutter includes a photoelectric transducer element which determines light reflection from the shutter blind surface and the film surface. The transducer element produces a photocurrent which charges an integrating capacitor. A correcting capacitor is disposed so as to be connected in parallel with the integrating capacitor during a part of the exposure time in order to correct the output voltage thereof for different reflectivities of the film surface and the shutter blind surface. The correcting capacitor is charged to the same voltage as that appearing across the integrating capacitor at the time the correcting capacitor is connected in parallel with the integrating capacitor.

10 Claims, 14 Drawing Figures

APPARATUS FOR DETERMINING LIGHT REFLECTION FROM A FOCAL PLANE SHUTTER

BACKGROUND OF THE INVENTION

The invention relates to an apparatus for determining light reflection from a focal plane shutter, and more particularly, to such apparatus which determines a proper exposure period automatically by the photometry of light from an object being photographed which is reflected by a shutter blind surface or a film surface or both.

A photometric device used in a camera has for its object the measurement of light from an object being photographed in order to assure a proper exposure of a film. Accordingly, a photometric, photoelectric transducer element is ideally disposed on a film surface or an equivalent surface such as a shutter blind of a focal plane shutter. However, such disposition of the element is impossible in practice, but a so-called direct photometry technique is conventionally employed in which a measurement of light from an object being photographed is made for which purpose the light is reflected by a film surface or an equivalent shutter blind surface. As is well recognized, when a focal plane shutter is used, the film surface is initially covered by the first blind of the shutter which is formed by a black cloth. As the first blind moves across the picture frame, starting in response to a shutter release, the film surface which has been covered by the first blind is increasingly exposed. When a proper exposure period has passed, the second blind of the shutter which is also formed by a black cloth starts to move across the screen to cover the exposed film surface.

With a high speed shutter operation or when the exposure period is very short, the second blind is caused to start running before the first blind has terminated its running so that a reduced exposure period may be obtained. As the shutter period is reduced, the width of the slit defined between the first and the second blind decreases in order to determine a proper exposure period. A measurement is made of light from an object being photographed, which light is initially reflected by the surface of the first blind of the shutter and then by the film surface which is being exposed. Because the shutter blind and the film surface have different values of optical reflectivity, some correction must be made to provide uniform optical reflectivity since otherwise the measurement of the reflected light cannot be correctly made, resulting in a failure to provide a proper exposure.

Accordingly, in prior art photometric devices of this type, the surface of the first blind is printed with a pattern of a material which exhibits the same reflectivity as the film surface. A shutter blind is usually formed by a front side cloth having a rubber lining on the rear side. Hence, it is very difficult to provide a printing on the front surface, resulting in a very expensive construction. In addition, variation in the pattern being printed causes a change in the reflectivity. It will also be noted that since the shutter blind is taken up into a roll at high speed, the blind surface has a poor planarity. The patterned coating or painting may be exfoliated. Finally, it is recognized that a black, delustering paint is applied to the interior of a camera in order to reduce stray light within a mirror box and leakage onto the film or to prevent a ghost or a flaring. However, when a reflecting pattern is printed on the surface of the first blind in order to achieve the same reflectivity as the film surface, it may interfere with the described extinction effect, causing the occurrence of a flaring or ghost.

Figure 1:
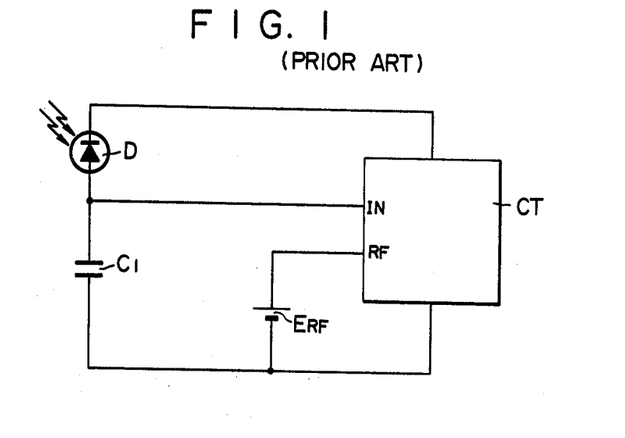
FIG. 1 is a circuit diagram of an exemplary electrical circuit of conventional apparatus for determining light reflection.

When the surface of the first blind of the shutter is treated to provide the same reflectivity as the film surface, a photometric circuit such as shown in FIG. 1 may be used to determine the reflection. Specifically, a photoelectric transducer element D such as a silicon photodiode is used to measure light reflected from the film surface and the surface of the first blind. The reflected light is converted into a photocurrent, which then charges a capacitor $C_1$ to provide an integrated voltage, which is then applied to one input terminal IN of a control circuit CT. A reference voltage from a source $E_{RF}$ is applied to the other input terminal RF of the control circuit CT, whereby the integrated voltage is compared to the reference voltage in order to determine a proper exposure period. A proposal has already been made which eliminates a disadvantage of such photometric circuit by directly using a black first shutter blind which is not provided with a printed pattern and making a correction to compensate for the differential reflectivities when determining light reflected from the blind surface and the film surface, in order to determine a proper exposure.

Figure 2:
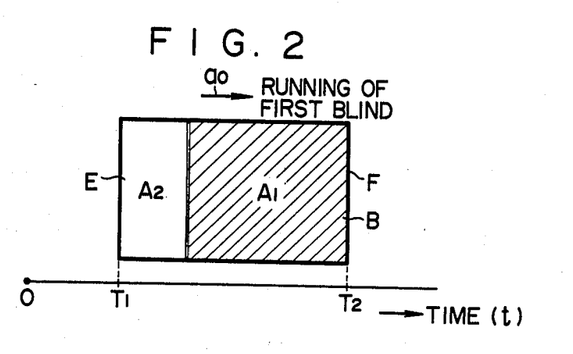
FIG. 2 is a schematic front view of a picture frame, illustrating the movement of a first shutter blind relative to a film surface.
Figure 3:
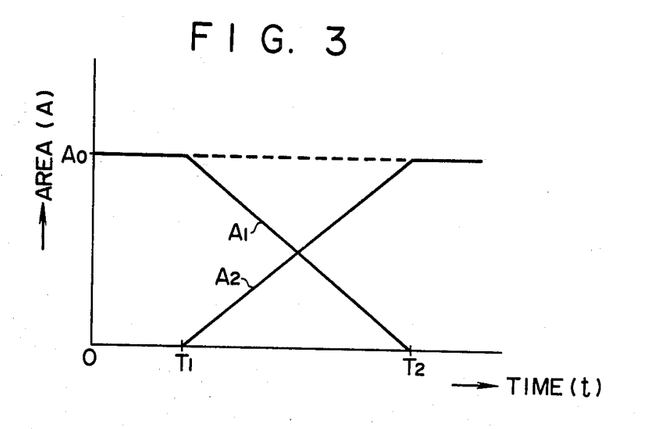
FIG. 3 graphically shows the area of exposed film surface and remaining surface of the first shutter blind plotted against the time.

Referring to FIG. 2, it will be noted that the film surface which has been initially covered by the first shutter blind will be gradually exposed as the first blind moves. FIG. 2 shows a rectangular picture frame F where it will be noted that a film surface E will be gradually exposed as a first blind B moves in a direction indicated by arrow $a_0$. The abscissa of FIG. 2 represents a time axis t which is required for movement of the first blind B. The exposure of the film surface is initiated at time $T_1$ when the first blind B has moved past the left-hand end of the picture frame F. The picture frame F will be fully exposed at time $T_2$ when the first blind B has moved past the right-hand end of the picture frame F. Time $t=T_2$ represents the termination of running of the first blind, exposing the entire picture frame. FIG. 2 shows an intermediate position of the first blind B where the film surface E is partly exposed. Representing the exposed area of the film surface E by $A_2$ and the area which is covered by the first blind B by $A_1$, the entire area $A_0$ of the picture frame F will be represented as $A_0=A_1+A_2$. FIG. 3 shows a change of these areas with respect to time t. Prior to time $T_1$ when the exposure of the film surface is initiated ($t<T_1$), the exposed area $A_2$ of the film surface E remains zero, and the entire surface $A_0$ of the picture frame F is covered by the first blind B, the area $A_1$ of which is equal to the entire area $A_0$ of the picture frame F. At time t between the time $T_1$ and time $T_2$ when the picture frame is fully open, the exposed area $A_2$ of the film surface E will increase in proportion to the time t while the area $A_1$ covered by the first blind B gradually decreases in proportion to the time t. However, the sum of the both areas $A_1$ and $A_2$ is equal to the entire area $A_0$. After time $T_2$, the area $A_2$ of the film surface E is equal to the entire area $A_0$ while the area $A_1$ covered by the first blind B becomes zero.

While the respective areas vary as the first shutter blind moves relative to the film surface, a proper exposure can ideally be determined if the first blind is absent and only the light reflected by the film surface is determined. However, in practice the first shutter blind produces reflected light. Hence, the light reflected from the first blind must also be determined. However, a correction may be made to compensate for any difference between the light reflected from the blind surface and light reflected from the film surface in deriving a proper exposure period.

As mentioned previously, the determination of light reflected from the blind surface and the film surface is made by using a photoelectric transducer element such as a silicon photodiode to produce a photocurrent, which in turn charges a capacitor to provide an integrated voltage, which is then compared against a given reference voltage to determine a proper exposure period.

Figure 4:
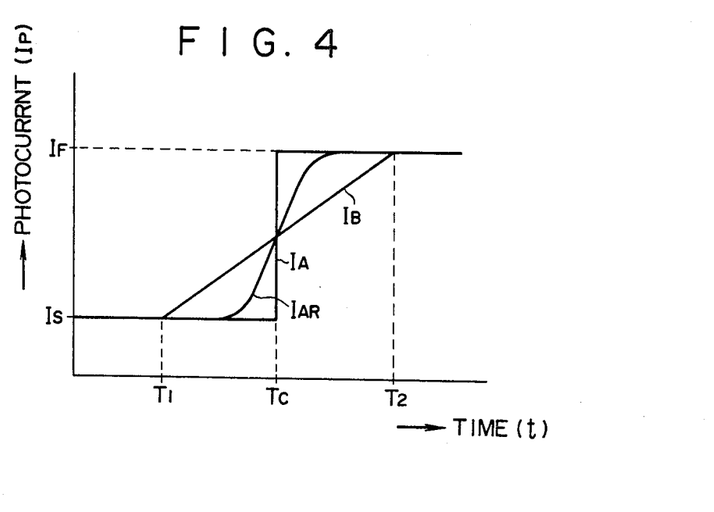
FIG. 4 graphically shows a change of photocurrent with time which is produced when determining light reflected from the film surface and the first shutter blind.

Referring to FIG. 4, the ordinate represents the photocurrent $I_P$ while the abscissa represents the time t. It will be apparent from the dotted line curve of this Figure that there will be a constant photocurrent $I_P$ which is equal to a photocurrent $I_F$ corresponding to the reflectivity of the film surface and which does not change with time t if the first shutter blind has the same reflectivity as the film surface. However, if the first shutter blind has a different reflectivity from that of the film surface, the photocurrent $I_P$ will vary with the movement of the first blind. In FIG. 4, times $T_1$, $T_2$ correspond to the same times shown in FIG. 2. Thus, at time $T_1$, the exposure of the film surface is initiated, and at time $T_2$, the picture frame is fully open. Time Tc represents an intermediate point between the times $T_1$ and $T_2$ when the first blind has passed the center of the film surface. A curve designated Is represents a photocurrent resulting from the reflection from the black surface of the first shutter blind which is not provided with a printed pattern. A curve If represents a photocurrent which results from the reflection from the film surface, as mentioned previously.

Curves $I_A$, $I_{AR}$ and $I_B$ of FIG. 4 represent changes which occur in the photocurrent by the reflection from the black surface of the first shutter blind which is not provided with a printed pattern. Specifically, curve $I_A$ represents a change in the photocurrent which will be produced when the photometry is effected with a photoelectric transducer element which is oriented to receive light principally from the center of the picture frame. Until time Tc when the first shutter blind passes the center of the film surface, the photocurrent will be equal to the value Is which results from the reflection from the surface of the first blind, while after Tc, it will be equal to the photocurrent If resulting from the reflection from the film surface. It will be appreciated that the curve $I_A$ is a theoretical illustration only since although it has a vertically rise at time Tc, the element having the principal orientation or light acceptance characteristic aligned with the center of the picture frame will receive light from a region centered about the center of the film surface, whereby the actual photocurrent will be represented by the curve $I_{AR}$. Thus, it has a point of deflection at time Tc, but there occurs no step change from the horizontal to the vertical, only a gradual change in the region of time Tc.

The curve $I_B$ represents a change in the photocurrent which will occur when a photoelectric transducer element having a uniform light acceptance characteristic is used for the photometry. The photocurrent increases in proportion to an increase in the exposed area of the film surface as the first blind runs. This curve $I_B$ corresponds to a change of the area A2 of the film surface shown in FIG. 3. Thus, the photocurrent represented by the curve $I_B$ is equal to the photocurrent Is resulting from the reflection from the blind surface prior to time $T_1$, and will be equal to the photocurrent $I_F$ resulting from the reflection from the film surface after time $T_2$.

Figure 5:
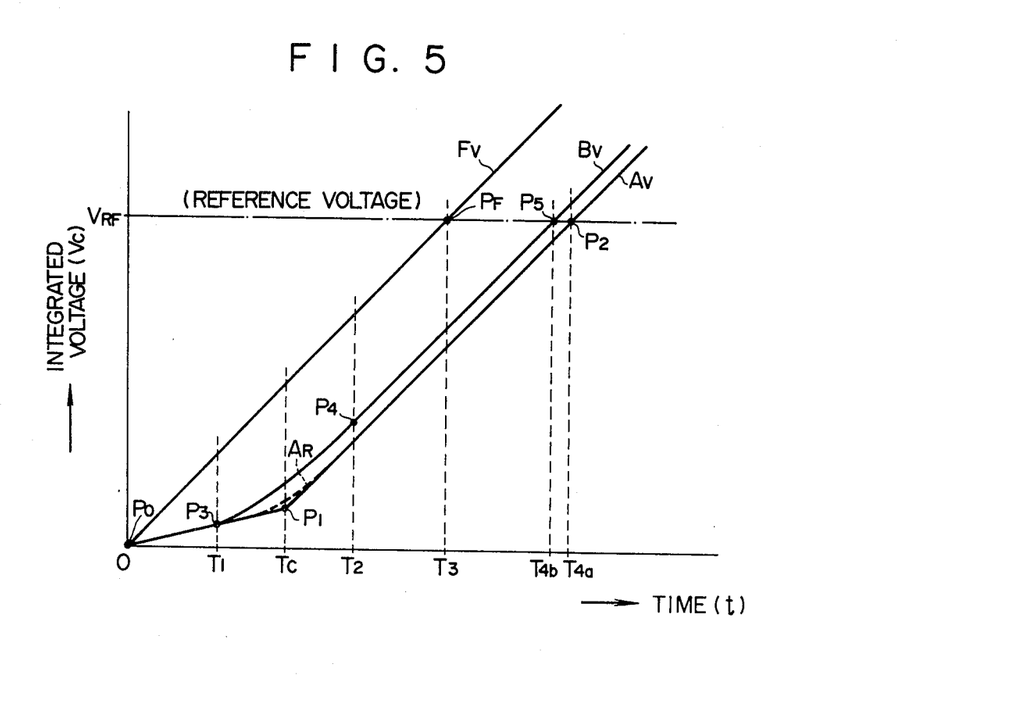
FIG. 5 graphically shows several characteristics indicative of a change of an integrated voltage with time which results from the reflection from the film surface and the first shutter blind.

FIG. 5 graphically shows a voltage which results from an integration of the photocurrent $I_P$. The ordinate represents the integrated voltage Vc and the abscissa the time t. In this Figure, a rectilinear line Fv represents an ideal illustration of an integrated voltage plotted over the time where the surface of the first blind has the same reflectivity as the film surface. By contrast, curves Av, Bv represent integrated voltages corresponding to the curves $I_A$ and $I_B$ shown in FIG. 4, respectively, when the shutter blind has a black surface which is not provided with a printed pattern. Specifically, the curve Av represents the integrated voltage for the photoelectric transducer element having the principal light acceptance characteristic oriented toward the center of the picture frame while the curve Bv represents the integrated voltage for the photoelectric transducer element having the uniform light acceptance characteristic.

Time $T_1$ on the abscissa represents the time when the exposure of the film surface is initiated while at time $T_2$, the picture frame is fully open. At time $T_3$, a proper exposure has been given and the second blind starts to run. Times $T_{4a}$ and $T_{4b}$ represent those times when the integrated voltage resulting from the reflection from the black surface of the first blind, not treated in any manner, becomes equal to a reference voltage $V_{RF}$ to be described later. $T_{4a}$ corresponds to the photometric transducer element having the centrally oriented principal light acceptance characteristic while $T_{4b}$ corresponds to the photoelectric transducer element having the uniform light acceptance characteristic. Time Tc represents the time when the first blind moves past the center of the film surface. The reference voltage $V_{RF}$ is shown on the ordinate, and when an integrated voltage becomes equal thereto, the second blind of the shutter is started moving, thus closing the shutter.

More closely considering the curve Av shown in FIG. 5, it will be noted that it exhibits a significant time delay with respect to the ideal curve Fv, exhibiting a lower voltage than the latter at all times. It will be seen that time $T_{4a}$ corresponding to the point of intersection $P_2$ between the curve Av and the reference voltage $V_{RF}$ is delayed with respect to time $T_3$ corresponding to the point of intersection $P_F$ between the line Fv and the reference voltage $V_{RF}$ by an amount $(T_{4a}-T_3)$, which represents an error in the exposure period. The curve Av has a break point $P_1$, and thus is formed by a pair of rectilinear portions $P_0-P_1$ and $P_1-P_2$. Since the curve Av represents an integral of the photocurrent shown by the curve $I_A$, as the first blind begins to open and until the time it moves part the center of the film (time Tc), the photoelectric transducer element receives light reflected from the surface of the first blind, and the resulting reflection is small, producing the photocurrent Is shown in FIG. 4. Accordingly, the integrated voltage increases in a rectilinear manner but at a lower rate, as indicated by line $P_0-P_1$. When the first blind passes the center of the picture frame at time Tc, the transducer element receives light reflected from the film surface, producing the photocurrent $I_F$. Hence the integrated voltage runs parallel to the line Fv, as indicated by line $P_1-P_2$.

On the other hand, with respect to the curve Bv, the integrated voltage remains the same until point $P_3$ which corresponds to time $T_1$, but as the film surface begins to be exposed at time $T_1$, the amount of light reflected increases gradually, and after point $P_4$ corresponding to time $T_2$ when the picture frame is fully open, the transducer element receives only light reflected from the film surface. Accordingly, the integrated voltage runs parallel to the line Fv. The curve Bv intersects with the level of the reference voltage $V_{RF}$ at point $P_5$ corresponding to time $T_{4b}$, which is delayed with respect to time $T_3$ corresponding to the point of intersection $P_F$ between the line Fv and the reference voltage $V_{RF}$, by an amount $(T_{4b}-T_3)$, which also represents an error in the exposure period. A dotted line curve $A_R$ corresponds to the curve $I_{AR}$ shown in FIG. 4 and is offset from the curve Av in the region adjacent to the break point $P_1$, in the same manner as the curve $A_R$ is offset from the ideal curve $I_A$.

Thus it will be noted that the amount of light reflected from the film surface and the first blind surface, formed by a black cloth, depends on the reflectivity of each surface. The photocurrent produced by the reflection from the film surface having an increased reflectivity is greater in magnitude than the photocurrent which result from the reflection from the black cloth surface of the first blind having a reduced reflectivity. Hence, the integrated voltage, representing an integral of such photocurrent, results as shown in FIG. 5.

Figure 6:
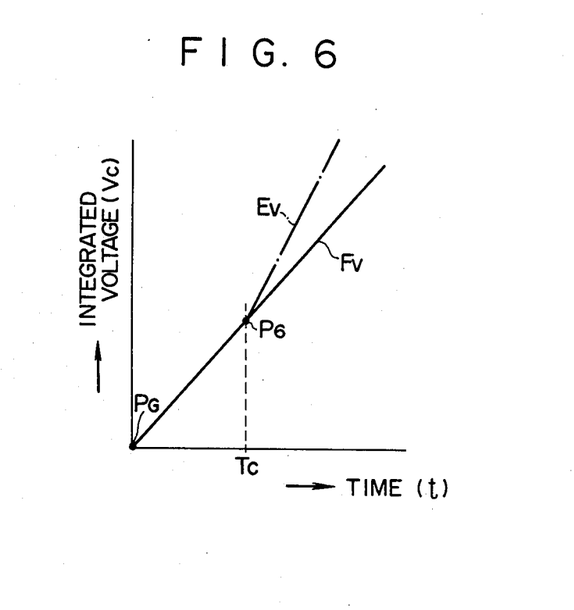
FIG. 6 graphically shows a curve representing a corrected integrated voltage plotted against the time.

It will be appreciated that an integrated voltage of a greater magnitude can be obtained from the reduced photocurrent which results from the reflection from the black cloth surface of the first blind if an integrating capacitor $C_1$ of a reduced capacitance is used. FIG. 6 graphically shows an integrated voltage which is obtained in this manner and which is shown by a curve $E_v$ which is offset from the ideal line Fv. The curve $E_v$ consists of a pair of rectilinear lines which are joined together at a break point $P_6$ corresponding to time Tc. The line portion PG-$P_6$ of the curve $E_v$ is obtained by using an integrating capacitor of a reduced capacitance and has the same inclination as the ideal curve Fv. The line portion beyond the break point $P_6$ deflects upwardly, in the same manner as the curves Av, Bv deflect upwardly after time Tc in FIG. 5 since then the amount of light being reflected increases to increase the photocurrent after time Tc. Hence, the upward deflection of the curve $E_v$ after point $P_6$ represents a deviation from the ideal line Fv.

Figure 7:
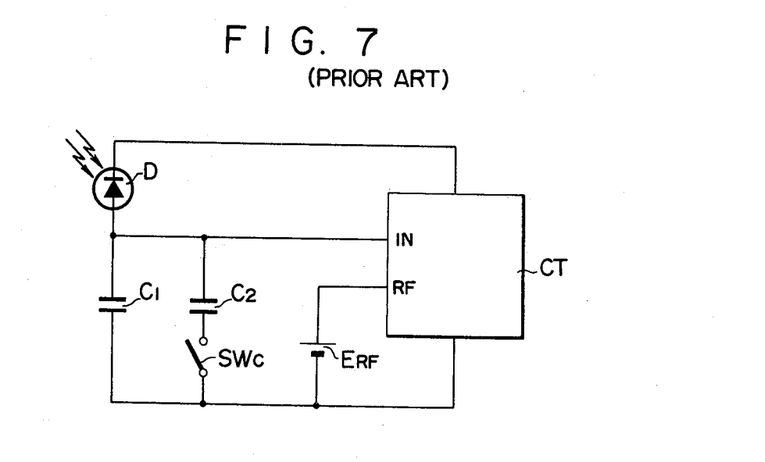
FIG. 7 is a circuit diagram of another form of an electrical circuit used in a conventional apparatus for determining reflection.

Means is provided in the prior art to connect a correcting capacitor in parallel with the integrating capacitor $C_1$ at time Tc in order to bring the curve $E_v$ of FIG. 6 into coincidence with the ideal line Fv. FIG. 7 shows a photometric circuit which is provided with such correction means. Specifically, the circuit arrangement is similar to that shown in FIG. 1 except that a correcting capacitor $C_2$ and a switch SWc is added thereto. The correcting capacitor $C_2$ may be connected in parallel with the integrating capacitor $C_1$ through the switch SWc. The switch SWc is closed at time Tc corresponding to the described break point as the first blind runs. When the switch SWc connects the correcting capacitor $C_2$ in parallel relationship with the integrating capacitor $C_1$ at the break point $P_6$ of FIG. 6, a deviation of the integrating voltage can be prevented, and the curve $E_v$ can be maintained close to the ideal line Fv.

Figure 8A:
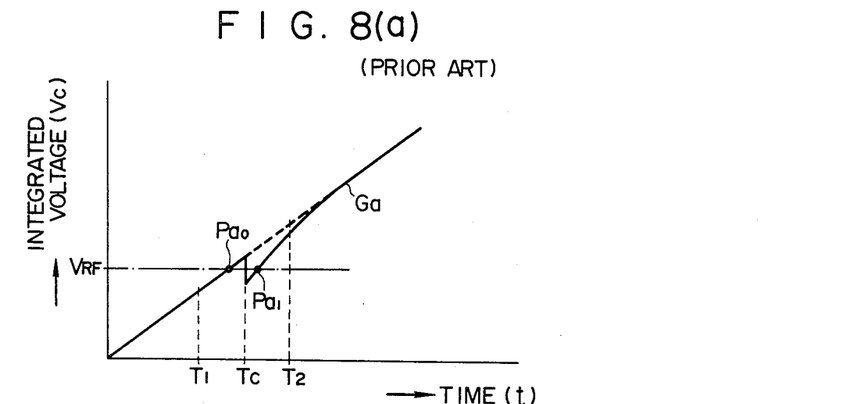
FIGS. 8(a) to (c) graphically show several examples of an integrated voltage which are obtained by the circuit shown in FIG. 7.
Figure 8B:
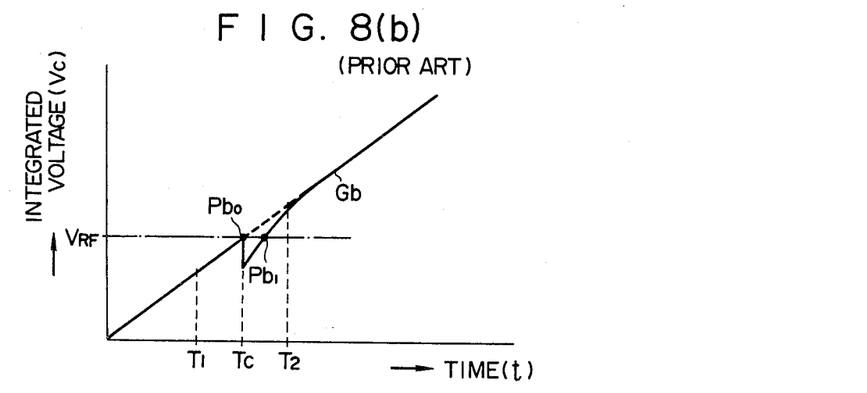
Figure 8C:
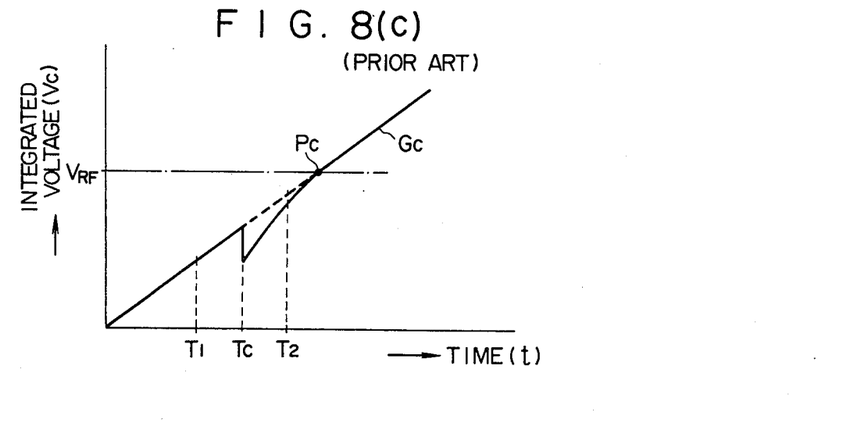

However, with the photometric circuit shown in FIG. 7, the correcting capacitor $C_2$ will be connected through the switch SWc while it is uncharged, so that the charge on the integrating capacitor $C_1$ will be momentarily discharged through the switch SWc to the empty correcting capacitor $C_2$. This results in an instantaneous reduction in the integrated voltge across the capacitor $C_1$ as shown in FIG. 8. FIGS. 8(a), (b) and (c) show three different curves Ga, Gb an Gc for the integrated voltage. The reference voltage $V_{RF}$ is shown on the ordinate. For the curve Ga shown in FIG. 8(a), this curve will intersect with the reference voltage $V_{RF}$ at two points $Pa_0$, $Pa_1$. In this instance, the control circuit CT (see FIG. 7) will respond to the point $Pa_0$ when determining an exposure period, and hence no problem is caused. However, for the curve Gb shown in FIG. 8(b), the point of intersection $Pb_0$ between the curve Gb and the reference voltage $V_{RF}$ is unstable when it occurs in time coincidence with time Tc. Any slight change in the amount of light being reflected (a decrease is shown) causes a corresponding change in the integrated voltage. In this instance, the reference voltage $V_{RF}$ will not be reached, and only the other point of intersection $Pb_1$ will be effective. In other words, the point in time when the exposure is to be terminated shifts from point $Pb_0$ to point $Pb_1$. This means that if the correcting capacitor $C_2$ is connected into the circuit at a point adjacent to the termination of the proper exposure period, the resulting exposure may be greatly influenced. In particular, when the connection takes place at a point close to the fully open position of the shutter around 1/60 second, the influence becomes particularly significant. For the curve Gc shown in FIG. 8(c), the intersection with the reference voltage $V_{RF}$ takes place at a signal point Pc, and hence poses no problem.

SUMMARY OF THE INVENTION

It is an object of the invention to provide an apparatus for determining light reflection from a focal plane shutter in which the described disadvantages are eliminated by the use of a correcting capacitor which is connected into circuit with an integrating capacitor through a switch and which is previously charged to the same potential as the potential across the integrating capacitor so that after the closure of the switch, the combination of the integrating capacitor and the correcting capacitor is effective to provide a correct conversion of a photocurrent from a photoelectric transducer element into an integrated voltage which is used as the basis to determine a proper exposure period.

In accordance with the invention, the correcting capacitor is precharged to the same potential as that across the integrating capacitor. Hence, when the correcting capacitor is connected with the integrating capacitor, a momentary reduction in the integrated voltage is avoided, preventing any significant shift in the time where the exposure is terminated.

In the apparatus of the invention, a black surface of a first shutter blind is directly utilized, avoiding any treatment such as printing a pattern thereon as has been used in the prior art in order to achieve the same reflectivity as the film surface. This results in an economical advantage over the use of a first blind having a printed pattern, eliminates an adverse influence of a variation in the pattern being printed upon the reflectivity as well as any likelihood of exfoliation of the coated pattern. In addition, since the black cloth of the first blind is used without any change, stray light within the mirror box is minimized and leakage to the film and the occurrence of ghost or flaring can be prevented, assuring the acquisition of a sharp image.

DESCRIPTION OF PREFERRED EMBODIMENT

Figure 9:
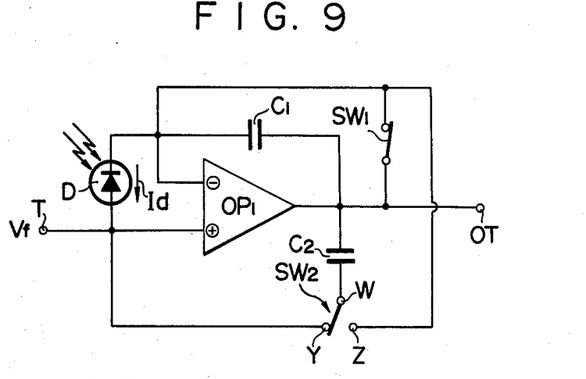
FIG. 9 is a circuit diagram of a photometric circuit of the apparatus according to the invention, principally indicating the principle thereof.

Referring to FIG. 9, there is shown the principle of operation of the photometric circuit which is used in the apparatus for determining light reflection according to the invention. The photometric circuit comprises an operational amplifier $OP_1$, a photoelectric transducer element D, an integrating capacitor $C_1$, a correcting capacitor $C_2$, a trigger switch $SW_1$, and a changeover switch $SW_2$.

The photoelectric transducer element D comprises a silicon photodiode or the like, and receives light reflected by the surface of a first blind and a film surface. It produces an electrical signal or a photocurrent which is proportional to the intensity of light from an object being photographed. The transducer element is connected across the non-inverting input terminal (hereafter referred to as positive terminal) and inverting input terminal (referred to hereafter as negative terminal) of the operational amplifier $OP_1$. The operational amplifier $OP_1$ may be a conventional operational amplifier, and substantially satisfies the ideal requirements of (a) a voltage gain of infinity, (b) an input resistance of infinity, (c) an output resistance of zero, (d) an input offset voltage of zero, (e) an input bias current of zero and (f) good frequency response. The integrating capacitor $C_1$ is charged by the photocurrent from the photoelectric transducer element D, and is connected across the negative terminal and the output terminal of the operational amplifier $OP_1$. The correcting capacitor $C_2$ is connected between the output terminal of the operational amplifier and the movable contact W of the changeover switch $SW_2$, and when the movable contact W is thrown to one fixed contact Y, the correcting capacitor $C_2$ is charged by the output current of the operational amplifier so as to assume the same voltage as that which is charged across the integrating capacitor $C_1$. When the movable contact W of the changeover switch is transferred to the other fixed contact Z, the correcting capacitor $C_2$ is connected in parallel relationship with the integrating capacitor $C_1$ through the movable contact W and the fixed contact Z of the switch $SW_2$. At this time the photocurrent of the transducer element D charges the parallel combination of capacitors $C_1$, $C_2$ so as to be integrated thereby. The changeover switch $SW_2$ is operated so that the movable contact W is switched from the fixed contact Y to the other fixed contact Z at time Tc shown in FIG. 5, that is, when the first shutter blind has moved across one-half the width of the film surface. The trigger switch $SW_1$ is normally closed and is connected in shunt with the integrating capacitor $C_1$, thus short-circuiting it. When the trigger switch $SW_1$ is opened in response to a shutter release operation, the photometric circuit shown in FIG. 9 becomes operative. The positive terminal of the operational amplifier $OP_1$ is also connected with a terminal T to which a reference voltage Vf is applied. The output terminal of the operational amplifier is connected with an output terminal OT which feeds an output signal from the photometric circuit to the next following exposure controlling, decision circuit (not shown).

In operation, when the shutter of the camera is released to initiate the running of the first shutter blind, the trigger switch $SW_1$ is opened simultaneously. Thus, the integrating capacitor $C_1$ is no longer short-circuited, and the photometric circuit becomes operative. In response to the shutter release, light from an object being photographed impinges through the lens of the camera upon the blind surface and the film surface, which begins to be exposed as the blind surface moves. Light impinging on these surfaces is reflected thereby to be incident on the photoelectric transducer element D. In response to the incidence of such reflected light, the transducer element D produces a photocurrent $Id$, which flows through the integrating capacitor $C_1$ to develop an integrated voltage $Vc_1$ thereacross. Assuming that the integrating capacitor $C_1$ has a capacitance of $C1'$, the integrated voltage thereacross can be expressed as follows:

$$Vc_1 = \frac{1}{C1'} \int Id\, dt \qquad (1)$$

By the nature of the operational amplifier, a potential difference across its positive terminal and its negative terminal remains zero, so that the potential of the negative terminal is equal to the reference voltage Vf. Hence, the operational amplifier $OP_1$ produces an output voltage $V_{01}$ which is expressed as follows:

$$\begin{aligned}V_{01} &= Vf + Vc_1 \\ &= Vf + \frac{1}{C1'} \int Id\, dt\end{aligned} \qquad (2)$$

Thus, the output voltage $V_{01}$ of the operational amplifier $OP_1$ gradually increases from the reference voltage Vf as the integrating capacitor $C_1$ continues to be charged by the photocurrent $Id$.

On the other hand, the correcting capacitor $C_2$ is charged by the output current from the operational amplifier. The charging current flows from the output terminal of the operational amplifier through the capacitor $C_2$ and the switch $SW_2$ to the terminal T. Hence, the voltage $V_{C2}$ across the capacitor $C_2$ will be represented by a potential difference across the output terminal of the operational amplifier and the terminal T as follows:

$$V_{c2} = V_{01} - Vf \tag{3}$$

Substitution of the equation (3) into the equation (2) yields:

$$V_{c2} = Vf + \frac{1}{C1'} \int Id\,dt - Vf \tag{4}$$
$$= \frac{1}{C1'} \int Id\,dt$$

thus, the voltage $V_{C2}$ to which the correcting capacitor $C_2$ is charged is equal to the voltage $V_{C1}$ to which the integrating capacitor $C_1$ is charged.

As the first blind continues to run farther until one-half the film surface becomes exposed, or at time Tc of FIG. 5, the changeover switch $SW_2$ is operated, throwing its movable contact W to the fixed contact Z. Thereupon, the capacitor $C_2$ is connected in shunt with the capacitor $C_1$, whereby the photocurrent Id charges both capacitors $C_1$ and $C_2$. Representing the capacitance of the capacitor $C_2$ by C2', the voltage $V_{C12}$ to which these capacitors are charged is expressed as follows:

$$V_{c12} = \frac{1}{C1' + C2'} \int Id\,dt \tag{5}$$

The resulting output voltage $V_{01c}$ of the operational amplifier $OP_1$ can be calculated in the same manner as the equation (2). Thus $$V_{01c} = Vf + \frac{1}{C1' + C2'} \int Id\,dt \tag{6}$$

The output voltage $V_{01}$ or $V_{01c}$ of the operational amplifier is applied to the following decision circuit through the output terminal OT.

Thus in accordance with the invention, the changeover switch $SW_2$ connects the correcting capacitor $C_2$ into parallel relationship with the integrating capacitor $C_1$ when it is charged to the same voltage as the latter, so that there occurs no offset in the integrated voltage, or the output voltage of the operational amplifier $OP_1$, at the time of such connection. This prevents any likelihood that the output voltage of the operational amplifier may be mistakenly recognized by the following decision circuit.

The above description covers the principle of the photometric circuit of the invention. An embodiment of the invention which is actually applied to an electrical shutter circuit is shown in FIG. 10, to which reference is now made.

Figure 10:
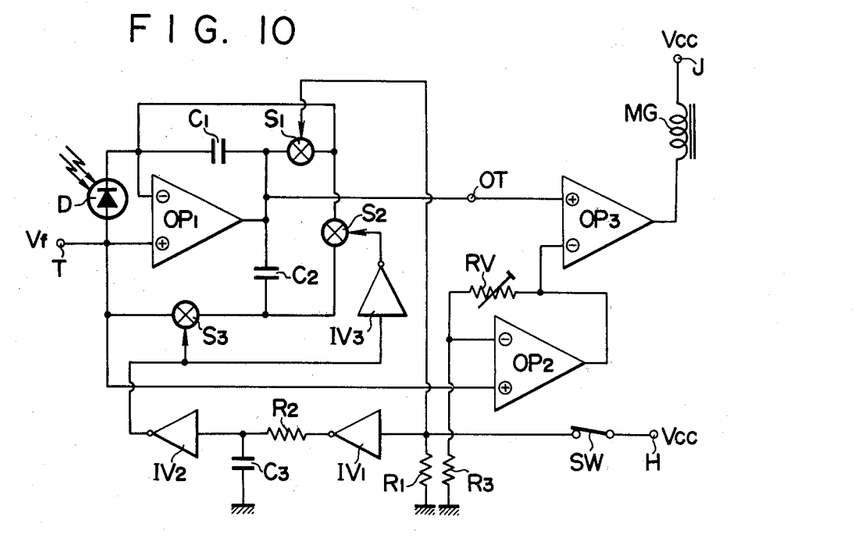
FIG. 10 is a detailed circuit diagram of the photometric circuit of the invention.

The circuit shown in FIG. 10 includes, in addition to the photometric circuit of the invention, a decision circuit which determines the output voltage of the photometric circuit, a switching timing circuit which is functionally equivalent to the changeover switch $SW_2$, a circuit for generating a reference voltage which is used in the decision circuit, and an electromagnet MG which controls the closure of the shutter.

Figure 11A:
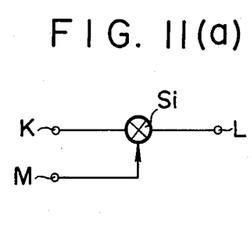
FIGS. 11(a) and (b) show an example of a CMOS analog switch which can be used in the circuit of FIG. 10.
Figure 11B:
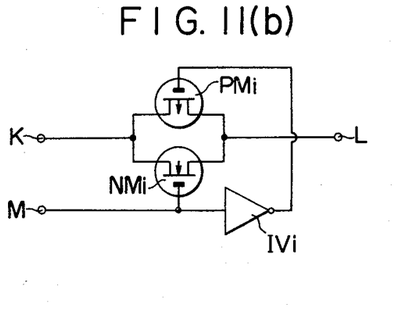

The photometric circuit remains the same in principle as the photometric circuit shown in FIG. 9. However, the switches $SW_1$ and $SW_2$ shown in FIG. 9 are replaced by well known CMOS analog switches $S_1$, $S_2$ and $S_3$. CMOS analog switch $S_1$ is illustrated in FIG. 11(a) and its internal construction is shown in FIG. 11(b). As shown, it comprises a combined CMOS transistor structure comprising NMOS transistor NMi and PMOS transistor PMi. In order to turn both transistors NMi, PMi on and off, the gate of transistor NMi is connected with the control terminal M while the gate of transistor PMi is connected with the output terminal of an inverter IVi. The inverter IVi has its input terminal connected to the control terminal M. The sources and drains of the parallel connected transistors NMi, PMi are connected with terminals K, L, respectively, and the conduction between the both terminals K, L is established or inhibited when the both transistors NMi, PMi are both turned on and off in response to a control signal applied to the control terminal M. Specifically, when a high level control signal is applied to the control terminal M, NMOS transistor NMi is turned on. The inverter IVi inverts the high level signal into a low level signal, which is applied to the gate of PMOS transistor PMi, thus turning it on. When the both transistor NMI, PMI are turned on in this manner, a conduction is established in both directions across the terminals K, L. When a low level control signal is applied to the control terminal M, the low level signal is applied to the gate of transistor NMi while a high level signal which is produced by the inversion by the inverter IVi is applied to the gate of transistor PMi, so that the both transistors are turned off, inhibiting a conduction across the terminals K, L. The terminals K, L and M shown in FIG. 11(a) correspond to the correspondingly designated terminals of FIG. 11(b).

Although reference characters designating the individual terminals are not shown for each of CMOS analog switches $S_1$, $S_2$ and $S_3$ shown in FIG. 10, the control terminal M to which the control signal is applied is indicated by an arrow as shown in FIG. 11(a). Since the terminals K, L are interchangeable, they are not specifically designated.

Returning to FIG. 10, the switching timing circuit comprises inverters $IV_1$, $IV_2$, $IV_3$, resistor $R_1$, and RC time constant circuit including resistor $R_2$ and capacitor $C_3$, and a trigger switch SW which is driven in response to a shutter release. The trigger switch SW is connected to a terminal H to which a supply voltage Vcc is applied. The trigger switch SW is normally closed, so that the supply voltage Vcc is applied to the input terminal of the inverter $IV_1$ and to the analog switch $S_1$. Consequently, the inverter IV, inverts the input voltage, and outputs a low level signal. In the condition shown, the timing capacitor $C_3$ is not charged, and hence the voltage thereacross is zero volt, which is applied to the input terminal of the inverter $IV_2$, which outputs a high level signal to be applied to the analog switch $S_3$ and to the input terminal of the inverter $IV_3$. Hence, the output voltage from the inverter $IV_3$ is at its low level. The low level output signal from the inverter $IV_3$ maintains the analog switch $S_2$ off. The analog switch $S_1$ is turned on by the supply voltage Vcc which is applied through the trigger switch SW. Thus, under normal condition, the integrating capacitor $C_1$ is short-circuited by the analog switch $S_1$ while the correcting capacitor $C_2$ is connected across the output terminal and the positive terminal of the operational amplifier $OP_1$ through the analog switch $S_3$.

When the trigger switch SW is turned off, the supply voltage Vcc ceases to be applied to the input terminal of the inverter $IV_1$ and to the control terminal of the analog switch $S_1$, and instead a ground potential or zero volt is applied thereto through the resistor $R_1$. Then the inverter $IV_1$ outputs a high level signal which is applied through the resistor $R_2$ to charge the capacitor $C_3$. The capacitor $C_2$ begins to be gradually charged from zero volt until the voltage thereacross exceeds an input threshold level of the inverter $IV_2$, whereupon the latter operates to output a low level signal. The time constant of the resistor $R_2$ and the capacitor $C_3$ is chosen to be equal to time Tc shown in FIG. 5. While in the arrangement of FIG. 9, the changeover switch $SW_2$ is operated at such time to throw the movable contact W from the fixed contact Y to the other fixed contact Z, in the circuit arrangement of FIG. 10, a delay circuit formed by the resistor $R_2$ and capacitor $C_3$ establishes such switching time. Obviously, this time corresponds to a point in time when the first shutter blind has moved across one-half the film surface. The low level signal from the inverter $IV_2$ turns the analog switch $S_3$ off, while the inverter $IV_3$ outputs a high level signal to turn the analog switch $S_2$ on.

At the same time as the trigger switch SW is turned off, the analog switch $S_1$ is turned off by a ground potential applied thereto through the resistor $R_1$, whereby the integrating capacitor $C_1$ is no longer short-circuited, rendering the photometric circuit operative. After a time delay determined by the values of the resistor $R_2$ and capacitor $C_3$, the analog switch $S_3$ is turned off and the analog switch $S_2$ is turned on, thus connecting the correcting capacitor $C_2$ in parallel with the integrating capacitor $C_1$.

The circuit which produces a reference voltage comprises an operational amplifier $OP_2$, a resistor $R_3$, and a semi-fixed resistor RV. The positive terminal of the operational amplifier $OP_2$ is connected to the terminal T. Representing the resistance of the resistor $R_3$ by $R_3'$ and the resistance of the semi-fixed resistor RV by $RV'$, the output voltage $V_{02}$ of the operational amplifier $OP_2$ is expressed as follows:

$$V_{02} = Vf\left(1 + \frac{RV'}{R_3'}\right) \quad (7)$$

The voltage $V_{02}$ is applied as a reference voltage to the negative terminal of an operational amplifier $OP_3$ which is contained in the decision circuit. It will be appreciated that the magnitude of this voltage can be adjusted by the semi-fixed resistor RV.

The decision circuit comprises only the operational amplifier $OP_3$. This operational amplifier operates as a comparator which compares the output voltage $V_{01}$ from the operational amplifier $OP_1$ of the photometric circuit against the output voltage $V_{01}$ from the operational amplifier $OP_2$. When the output voltage $V_{01}$ exceeds the output voltage $V_{02}$ or the reference voltage, the output of the operational amplifier $OP_3$ changes from a high level to a low level, thus resetting the shutter closing electromagnet MG to operate the second shutter blind for running.

In operation, when a shutter release operation takes place, the first blind begins to run, and simultaneously the trigger switch SW is turned off. This turns the analog switch $S_1$ off, whereby the integrating capacitor $C_1$ is no longer short-circuited, rendering the photometric circuit operative. The photoelectric transducer element D receives light reflected from the blind surface and the film surface, and produces a photocurrent in proportion to the magnitude of such light input to charge the integrating capacitor $C_1$.

On the other hand, when the trigger switch SW is turned off, the inverter $IV_1$ produces a high level output signal which is fed through the resistor $R_2$ to charge the capacitor $C_3$. The correcting capacitor $C_2$ is connected across the output terminal and the positive terminal of the operational amplifier $OP_1$ to be charged by the output current thereof until the voltage across the capacitor $C_3$ reaches a given value. As mentioned previously, the correcting capacitor $C_2$ is charged to the same voltage to which the integrating capacitor $C_1$ is charged.

As the capacitor $C_3$ continues to be charged and its voltage reaches the threshold level of the inverter $IV_2$ after a given time delay, this inverter $IV_2$ operates to output a low level signal, which turns the analog switch $S_3$ off and which is inverted to a high level signal by the inverter $IV_3$ to turn the analog switch $S_2$ on. Consequently, the correcting capacitor $C_2$ is connected in parallel with the integrating capacitor $C_1$ through the analog switch $S_2$. Subsequently, the photocurrent from the transducer element D charges the parallel connected capacitors $C_1$ and $C_2$.

The output voltage of the operational amplifier $OP_1$ which varies as indicated by the equations (2) and (6) is applied through the output terminal OT to the positive terminal of the operational amplifier $OP_3$, the negative terminal of which receives the output voltage of the operational amplifier $OP_2$ as the reference voltage. In this manner, the output voltage of the operational amplifier $OP_1$ is compared against the reference voltage. The output voltage of the operational amplifier $OP_1$ increases gradually until it eventually exceeds the reference voltage, whereupon the output voltage of the operational amplifier $OP_3$ changes to reset the electromagnet MG, causing the second blind to run to terminate the shutter operation.

It is to be understood that the connection of the individual operational amplifiers shown in FIGS. 9 and 10 with a positive and a negative power supply is omitted.

In the circuits shown in FIGS. 9 and 10, the trigger and the changeover switch are shown as a mechanical switch and CMOS analog switch, but may be replaced by other switching elements such as transistors or thyristors.

What is claimed is:

1. An apparatus for determining light reflection from a focal plane shutter of the type that includes a first shutter blind which initiates exposure of a photographic film and which has a light-reflective surface facing a direction from which light is to be admitted for exposing a photographic film, and a second shutter blind which terminates said exposure; said apparatus comprising:

a photoelectric transducer element for determining the amount of light that is reflected from the surface of the shutter blind and also from the surface of a negative when a camera that includes said apparatus contains photographic film in a position which will cause said film to be exposed by the light; said photoelectric transducers element further being for generating a photocurrent which is representative of the amount of light being received;

an integrating capacitor for integrating said photocurrent for determining proper exposure time;

a correcting capacitor for compensating for the different reflectivities of the surface of the first shutter blind and the film surface;

switch means for connecting said correcting capacitor in parallel with said integrating capacitor a predetermined time after a shutter operation; and means for charging said correcting capacitor in such a manner that the voltage thereacross is the same as the voltage across said integrating capacitor at the time said correcting capacitor is connected in parallel with said integrating capacitor.

2. An apparatus according to claim 1, in which said means for charging said correcting capacitor comprises an operational amplifier having an output terminal an inverting input terminal and a non-inverting input terminal; and said photoelectric transducer element being connected between said input terminals and said integrating capacitor being connected between said output terminal and one of said input terminals; and said switch means comprising a changeover switch having a first position in which it connects said correcting capacitor between said output terminal and the other of said input terminals of said operational amplifier and having a second position in which it connects said correcting capacitor in parallel with said integrating capacitor.

3. An apparatus according to claim 2, in which said changeover switch comprises a fixed contact for connecting said correcting capacitor with said other input terminal of said operational amplifier and another fixed contact for connecting said correcting capacitor in parallel with said integrating capacitor.

4. An apparatus according to claim 1, further comprising second switch means for short-circuiting said integrating capacitor when a photograph is not being taken, and which is opened in response to a shutter release operation.

5. An apparatus according to claim 1, further comprising a decision circuit for controlling the movement of th second shutter blind to control the exposure time, responsive to the voltage across said integrating capacitor.

6. An apparatus according to claim 5 in which said decision circuit comrises an operational amplifier.

7. An apparatus according to claim 1, in which said switch means is for connecting said correcting capacitor in parallel with said integrating capacitor when the first shutter blind has moved across one-half of the film surface.

8. An apparatus according to claim 1 in which said photoelectric transducer element is oriented to receive principally light reflected from a central portion of the film surface.

9. An apparatus according to claim 1 in which said photoelectric transducer element comprises a silicon photodiode.

10. An apparatus according to claim 1 in which said switch means comprises a CMOS analog switch.

* * * * *